(12) United States Patent
Reid et al.

(10) Patent No.: US 11,340,023 B1
(45) Date of Patent: May 24, 2022

(54) COUNTER GRAVITY HEAT PIPE TECHNIQUES

(71) Applicant: Triad National Security, LLC, Los Alamos, NM (US)

(72) Inventors: Robert S. Reid, Santa Fe, NM (US); Robert A. Zimmerman, Los Alamos, NM (US); Cody M. Williams, San Diego, CA (US); Morgan T. Biel, Los Alamos, NM (US); Stephen J. Obrey, Los Alamos, NM (US); Todd A. Jankowski, Los Alamos, NM (US); Justin Simpson, Albuquerque, NM (US); Martin J. Ward, Austin, TX (US); Lydia Wermer, Notre Dame, IN (US)

(73) Assignee: Triad National Security, LLC, Los Alamos, NM (US)

( * ) Notice: Subject to any disclaimer, the term of this patent is extended or adjusted under 35 U.S.C. 154(b) by 181 days.

(21) Appl. No.: 15/921,800

(22) Filed: Mar. 15, 2018

Related U.S. Application Data

(60) Provisional application No. 62/476,342, filed on Mar. 24, 2017.

(51) Int. Cl.
| | |
|---|---|
| *F28D 15/04* | (2006.01) |
| *F28D 15/02* | (2006.01) |
| *G21C 15/02* | (2006.01) |
| *G21C 15/257* | (2006.01) |

(Continued)

(52) U.S. Cl.
CPC ....... *F28D 15/043* (2013.01); *F28D 15/0266* (2013.01); *F28D 15/0275* (2013.01); *G21C 15/02* (2013.01); *G21C 15/243* (2013.01); *G21C 15/257* (2013.01); *F28D 2015/0216* (2013.01); *F28D 2015/0291* (2013.01); *F28D 2021/0054* (2013.01)

(58) Field of Classification Search
CPC ...... F28D 15/04; F28D 15/043; F28D 15/025; F28D 15/0266; F28D 15/0275; F28D 2015/0291; G21C 15/02; G21C 15/243; G21C 15/257
See application file for complete search history.

(56) References Cited

U.S. PATENT DOCUMENTS

| | | | | |
|---|---|---|---|---|
| 4,470,450 A | * | 9/1984 | Bizzell | F28D 15/043 165/104.25 |
| 5,303,768 A | * | 4/1994 | Alario | F28D 15/043 122/366 |

(Continued)

*Primary Examiner* — Tho V Duong
(74) *Attorney, Agent, or Firm* — Alston & Bird LLP

(57) ABSTRACT

A pump assisted heat pipe may combine the low mass flow rate required of latent heat pipe transfer loops with a hermetically sealed pump to overcome the typical heat pipe capillary limit. This may result in a device with substantially higher heat transfer capacity over conventional pumped single-phase loops, heat pipes, loop heat pipes, and capillary pumped loops with very modest power requirements to operate. Further, one or more embodiments overcome the gravitation limitations in the conventional heat pipe configuration, e.g., when the heat addition zone is above the heat rejection zone, the capillary forces are required to transfer the liquid from the heat rejection zone to the heat addition zone against gravity.

6 Claims, 12 Drawing Sheets

(51) Int. Cl.
*G21C 15/243* (2006.01)
*F28D 21/00* (2006.01)

(56) References Cited

U.S. PATENT DOCUMENTS

| | | | | |
|---|---|---|---|---|
| 5,725,049 | A * | 3/1998 | Swanson | F28D 15/043 |
| | | | | 122/366 |
| 6,330,907 | B1 * | 12/2001 | Ogushi | F28D 15/043 |
| | | | | 165/104.26 |
| 7,013,956 | B2 * | 3/2006 | Thayer | F25B 23/006 |
| | | | | 165/104.25 |
| 2003/0042009 | A1 * | 3/2003 | Phillips | F28D 15/043 |
| | | | | 165/104.26 |
| 2004/0040691 | A1 * | 3/2004 | Jacque | B64G 1/506 |
| | | | | 165/42 |
| 2005/0117298 | A1 * | 6/2005 | Koga | G06F 1/203 |
| | | | | 361/699 |
| 2011/0192575 | A1 * | 8/2011 | Figus | F28D 15/043 |
| | | | | 165/104.26 |
| 2012/0137718 | A1 * | 6/2012 | Uchida | H05K 7/20336 |
| | | | | 62/259.2 |

\* cited by examiner

COUNTER GRAVITY HEAT PIPE TECHNIQUES

CROSS-REFERENCE TO RELATED APPLICATION

This application claims the benefit of U.S. Provisional Application No. 62/476,342, filed on Mar. 24, 2017. The subject matter thereof is hereby incorporated herein by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention relates to counter gravity heat pipes, and more particularly, to capillary assisted and pump assisted heat pipes that may transfer heat with small temperature difference and with enhanced heat transfer limits.

BACKGROUND

Lorentz forces typically transport liquid metals inside hermetically sealed heat transfer loops. The process is very inefficient, especially when applied to sensible single-phase heat transfer loops. Further, while circulation of the working fluid in all forms of heat pipes (using either liquid metal or non-liquid metal working fluids) are low in mass flow rate due to the two phase (latent heat) nature of the process, the circulation of the working fluid is limited by gravity forces.

Thus, an alternative approach to overcome gravity forces may be beneficial.

SUMMARY

Certain embodiments of the present invention may provide solutions to the problems and needs in the art that have not yet been fully identified, appreciated, or solved by current heat pipe configurations. In some embodiments, the present invention generally pertains to a capillary assisted and/or pump assisted heat pipe that combines the low mass flow rate required of latent heat pipe transfer loops with a hermetically sealed pump to overcome the typical heat pipe capillary limit. This may result in a device with substantially higher heat transfer capacity over conventional pumped single-phase loops, heat pipes, loop heat pipes, and capillary pumped loops with very modest power requirements to operate. Further, one or more embodiments overcome the gravitation limitations in the conventional heat pipe configuration, e.g., when the heat addition zone is above the heat rejection zone, the capillary forces are required to transfer the liquid from the heat rejection zone to the heat addition zone against gravity.

In an embodiment, a counter-gravity two-phase heat pipe loop includes an artery configured to move liquid from a liquid pool to an upper chamber by a capillary syphon or a mechanical pump. The capillary syphon, the mechanical pump, or both, are configured to move the liquid from a condenser region to the upper chamber and are further configured to maintain pressure in the upper chamber to move the liquid from the upper chamber across a capillary. The capillary syphon is thermally induced, and the mechanical pump is energized by an electric motor. The counter-gravity two-phase heat pipe loop also includes a liquid transport structure hydraulically connecting the upper chamber to a vapor space, wherein the vapor space is configured to vaporize the liquid in an evaporation zone and condense the liquid in one or more cold zones, wherein the one or more cold zones are distinct from the evaporation zone.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

A hermetically sealed pumped two-phase heat pipe loop may include working fluid consisting of a liquid and vapor phase that operates between the triple and critical points. The two-phased heat pipe loop may also include an internal or external artery, an upper chamber, a vapor space, a plug, and/or a wick. In certain embodiments, a liquid transport structure may hydraulically connect the upper chamber to the vapor space. A pump energized by an electric motor may move liquid from the condenser region to the upper chamber. The pump may maintain a pressure in the upper chamber sufficient to move liquid from the upper chamber across the capillary or similar resistance. The liquid may then flow, via capillary action through a porous medium or as a gravity film, to the heated (or evaporation) zone where the liquid is vaporized. The vaporized liquid may then be condensed onto cold surfaces within the pipe. Part of the liquid may return to the evaporator by capillary or gravity forces. Part or all of the liquid may also return to the evaporator by the pump and through the artery.

Pumped Heat Pipe

Figure 1A:
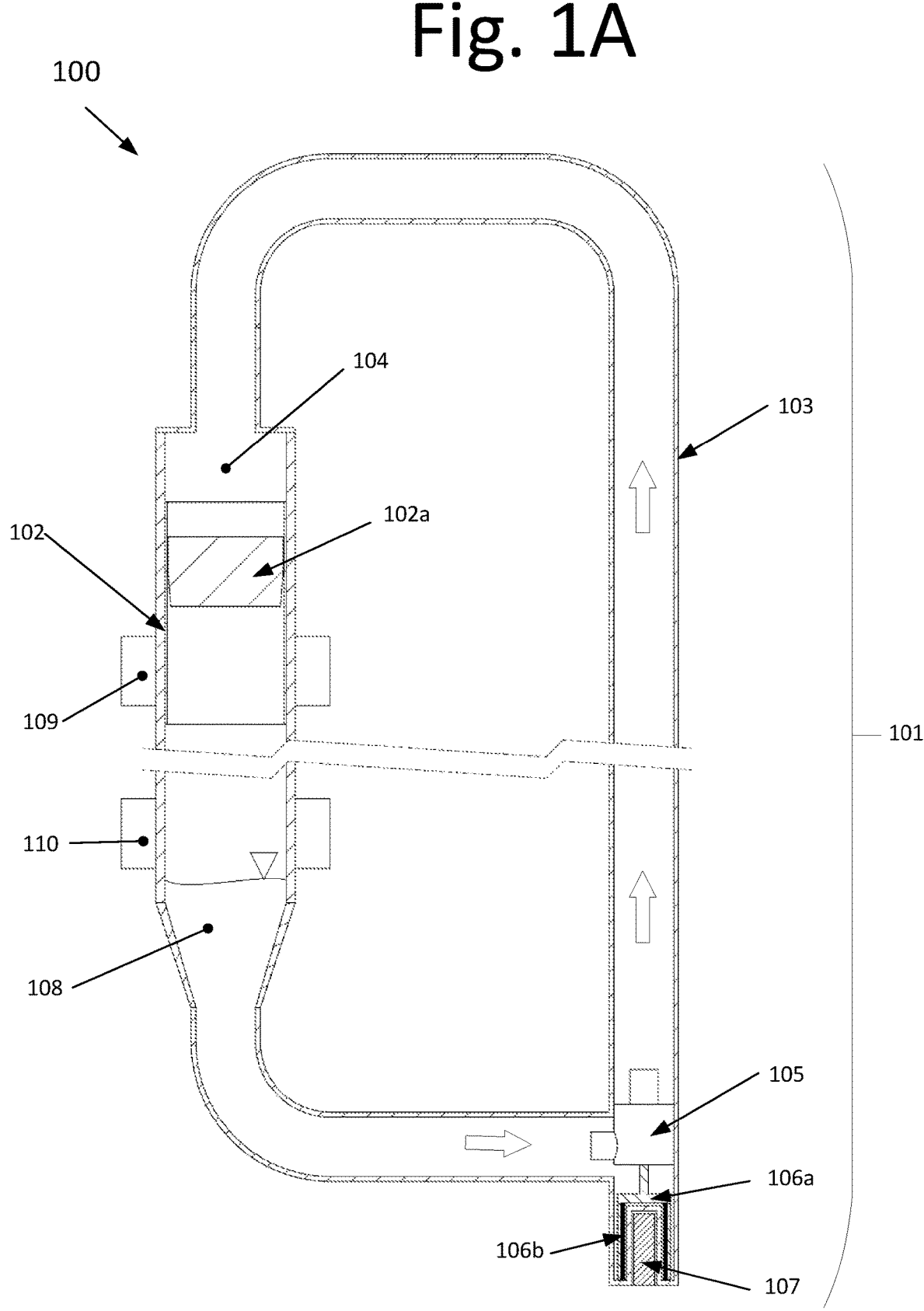
FIG. 1A illustrates a cross-sectional view of a pumped two-phase heat pipe loop with an internal pump and an external artery, according to an embodiment of the present invention.

FIG. 1A illustrates a cross-sectional view of a pumped two-phase heat pipe loop (or "heat pipe loop") 100 with an internal pump 105 and an external artery 103, according to an embodiment of the present invention. In this embodiment, pump 105 is internal to heat pipe loop 100, and artery 103 is external to the components of heat pipe loop 100. Container 101, which includes pump 105, motor assembly 106a, 106b, and artery 103, may hermetically enclose a two-phase heat transfer system. Container 101 may also incorporate trace heat to maintain the working fluid above its melting point during operation. In this embodiment, motor assembly 106a, 106b is submerged within working fluid (or in some embodiments "the condensed working fluid or liquid").

In FIG. 1A, the working fluid (e.g., liquid or vapor) may flow through wick (also referred to as "liquid transport structure") 102 situated on the periphery of plug 102a from a high-pressure liquid zone 104 (e.g., a chamber that holds liquid) and to an evaporation zone 109. Liquid zone 104 may include liquid, and the pressurized liquid flows in wick 102, across the periphery of plug 102a, and into evaporation zone 109. Heat applied in evaporation zone 109 conducts across wall 101 and vaporizes liquid in the section of wick 102 in evaporation zone 109. In some embodiments, evaporation zone 109 is also known as a hot zone.

Vapor from wick 102 travels to or near cold zone 110. The vaporized working fluid may condense in the tube surrounded by cold zone 110. In this embodiment, the working fluid, including the vapor, moves axially down the length of the tube to a cold zone 110 where the working fluid condenses. In some embodiments, any liquid film that has not been vaporized in evaporation zone 109 may fall along the inside surface of wick 102. This may include wick 102 to cold zone 110 or to liquid pool 108. In other embodiments, the working fluid may move in the opposite direction. However, this is dependent upon the configuration of pumped two-phase heat pipe loop 100.

The working fluid condensate may pool at or near 108 and may be drawn into pump 105. The condensate may need to be at sufficiently low temperature to prevent cavitation in pump 105. This may also apply to the other embodiments in FIGS. 2A-5. In this embodiment, pump impeller 105 is moved by an out runner magnet rotor ("rotor") 106a, and magnet 106b, and a series of field windings 107. See, for example, FIGS. 1B and 1C. Rotor 106a and magnet 106b are internal to the hermetic enclosure, and field windings 107 are external to the hermetic enclosure. Collectively, rotor 106 and field windings 107 form a brushless direct current or an electrical motor with a similar function. See, for example, FIGS. 1B and 1C.

Figure 1B:
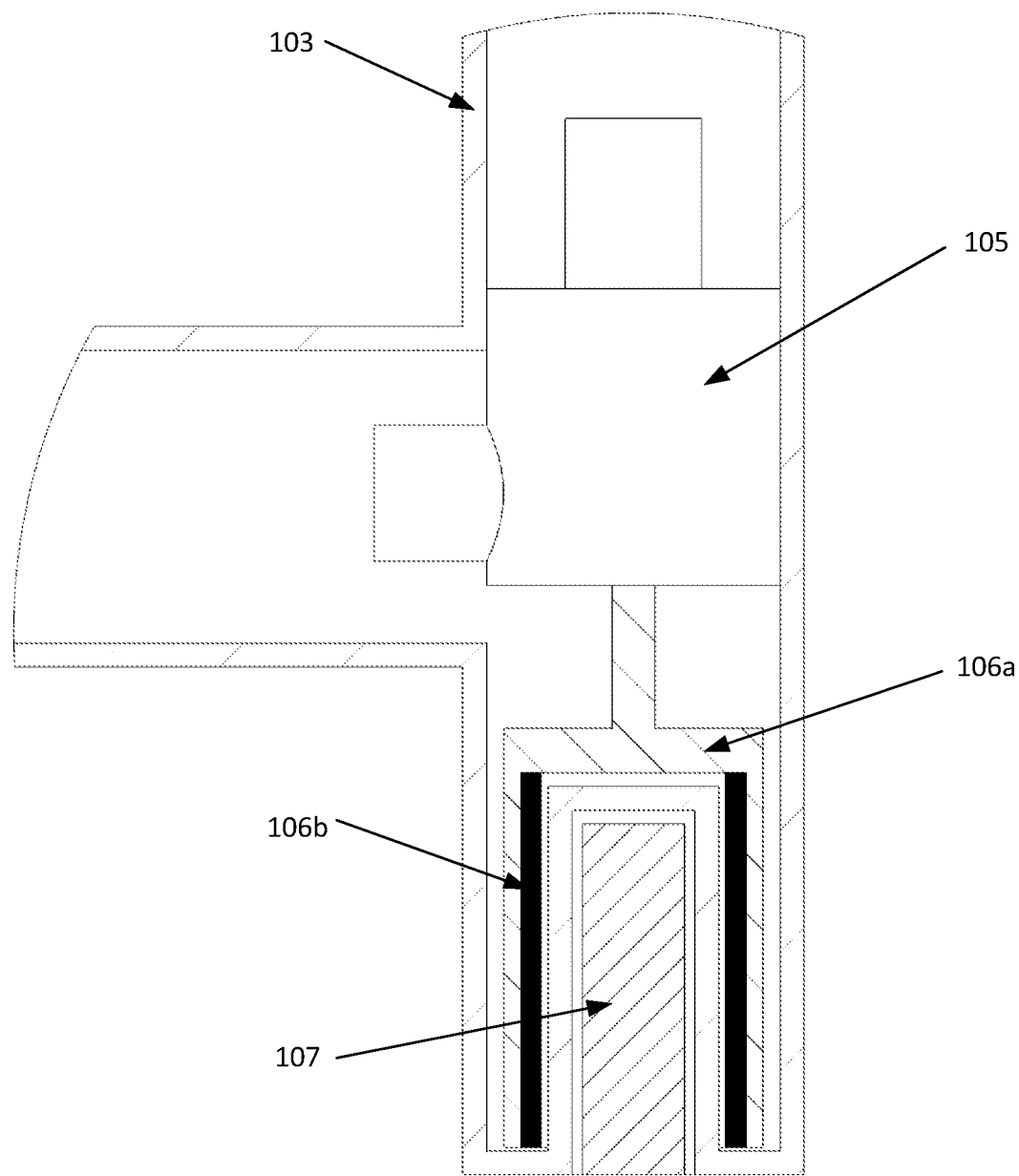
FIG. 1B illustrates a cross-sectional view.
Figure 1C:
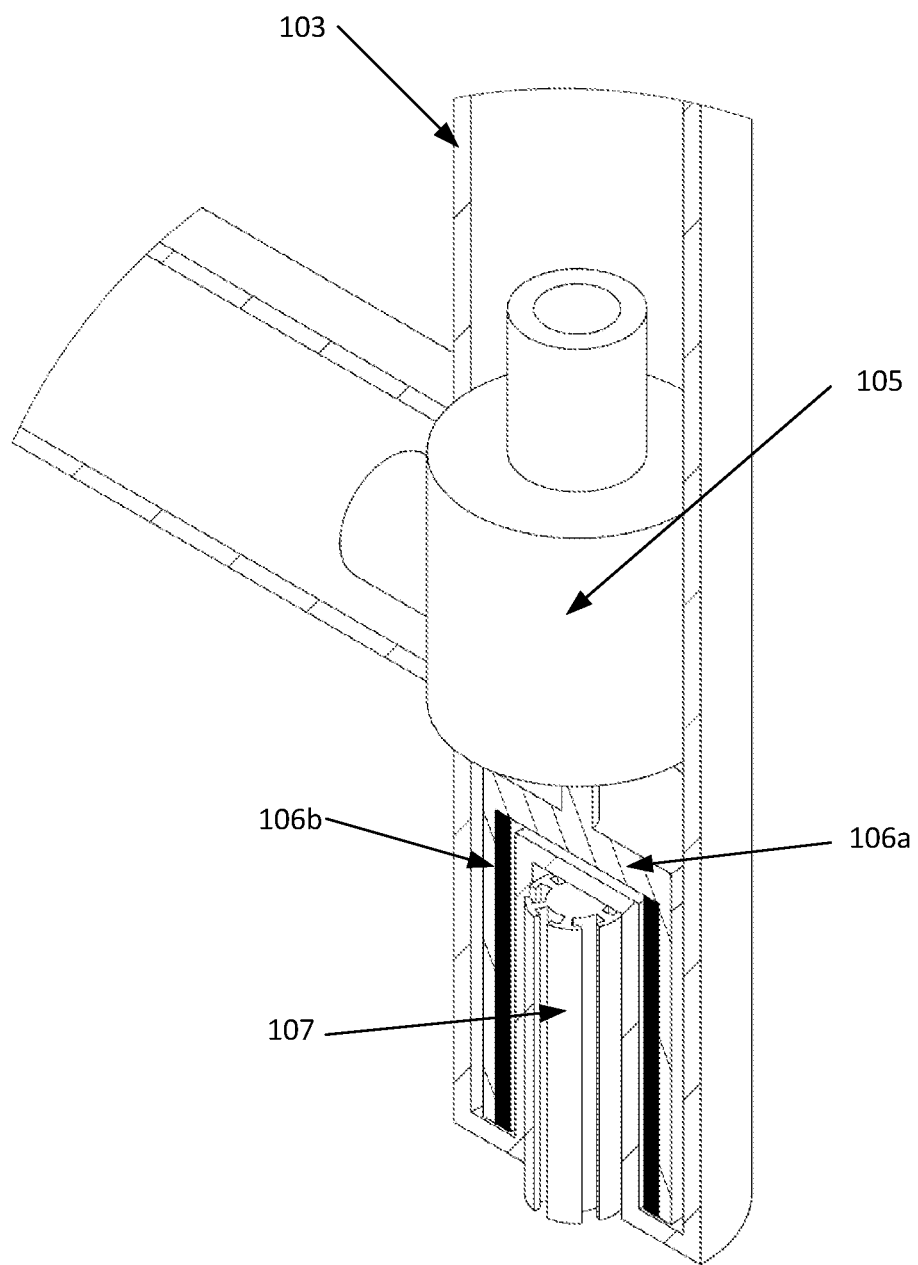
FIG. 1C illustrates a prospective view, of the motor and pump of the pumped two-phase heat pipe loop of FIG. 1A, according to an embodiment of the present invention.

In FIG. 1B, magnet 106b is below the Curie point temperature of magnet material. This may also apply to the magnet shown in the embodiments of the other figures within this application. Further, the hermetic enclosure is non-magnetic or weakly magnetic in the vicinity of magnet 106b. This may hold true for the other embodiments shown in FIGS. 2A-5.

Pump 105 may move the liquid working fluid up an external artery 103 to maintain pressure at liquid zone 104. In some embodiments, the pressure is sufficient to move the liquid working fluid through wick 102 across plug 102a by Darcy flow or mechanisms that provide a similar flow.

Figure 1D:
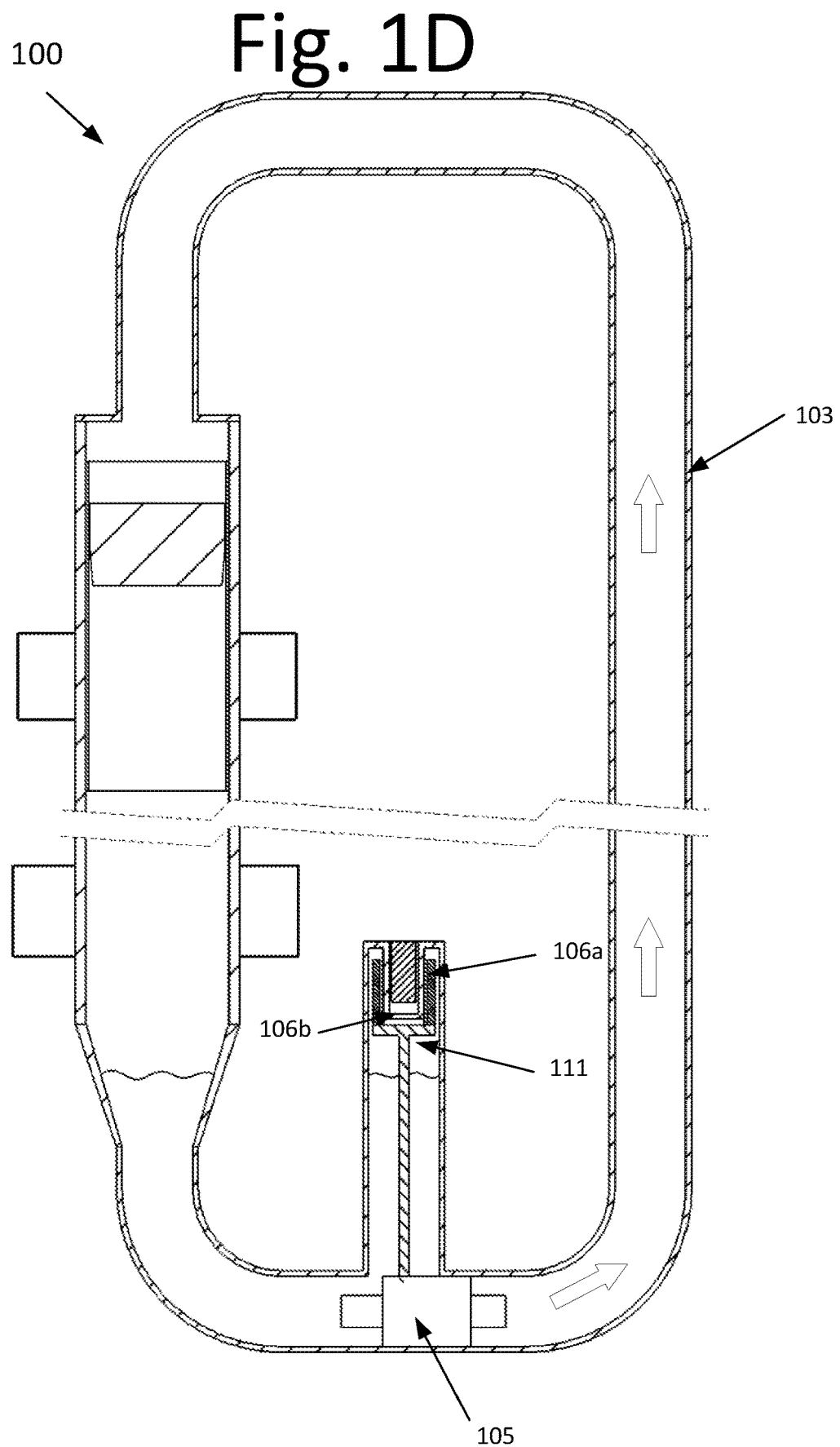
FIG. 1D illustrates a cross-sectional view of a pumped two-phase heat pipe loop (or "heat pipe loop") with an internal pump and an external artery, according to an embodiment of the present invention.

FIG. 1D illustrates a cross-sectional view of a pumped two-phase heat pipe loop (or "heat pipe loop") 100 with an internal pump 105 and an external artery 103, according to an embodiment of the present invention. Unlike FIGS. 1A-C, motor assembly 106a, 106b is above liquid level rather than being immersed within the working fluid. By placing motor assembly 106a, 106b in vapor space (or in some embodiments, a space filled with non-condensable gas or a vacuum space) 111, the friction losses in motor assembly 106a, 106b are reduced due to lower working fluid viscosity.

The placement of motor assembly 106a, 106b thermally isolates magnet 106b from the working fluid, permitting motor operation at lower temperature when the working fluid is hot. Further, placement of motor magnets above the hot working fluid permit the motor magnets to operate below the Curie point temperature, in some embodiments. The temperature of motor magnets should be below the Curie point temperature of the magnet material. This way, the motor magnets maintain magnetism.

Figure 2A:
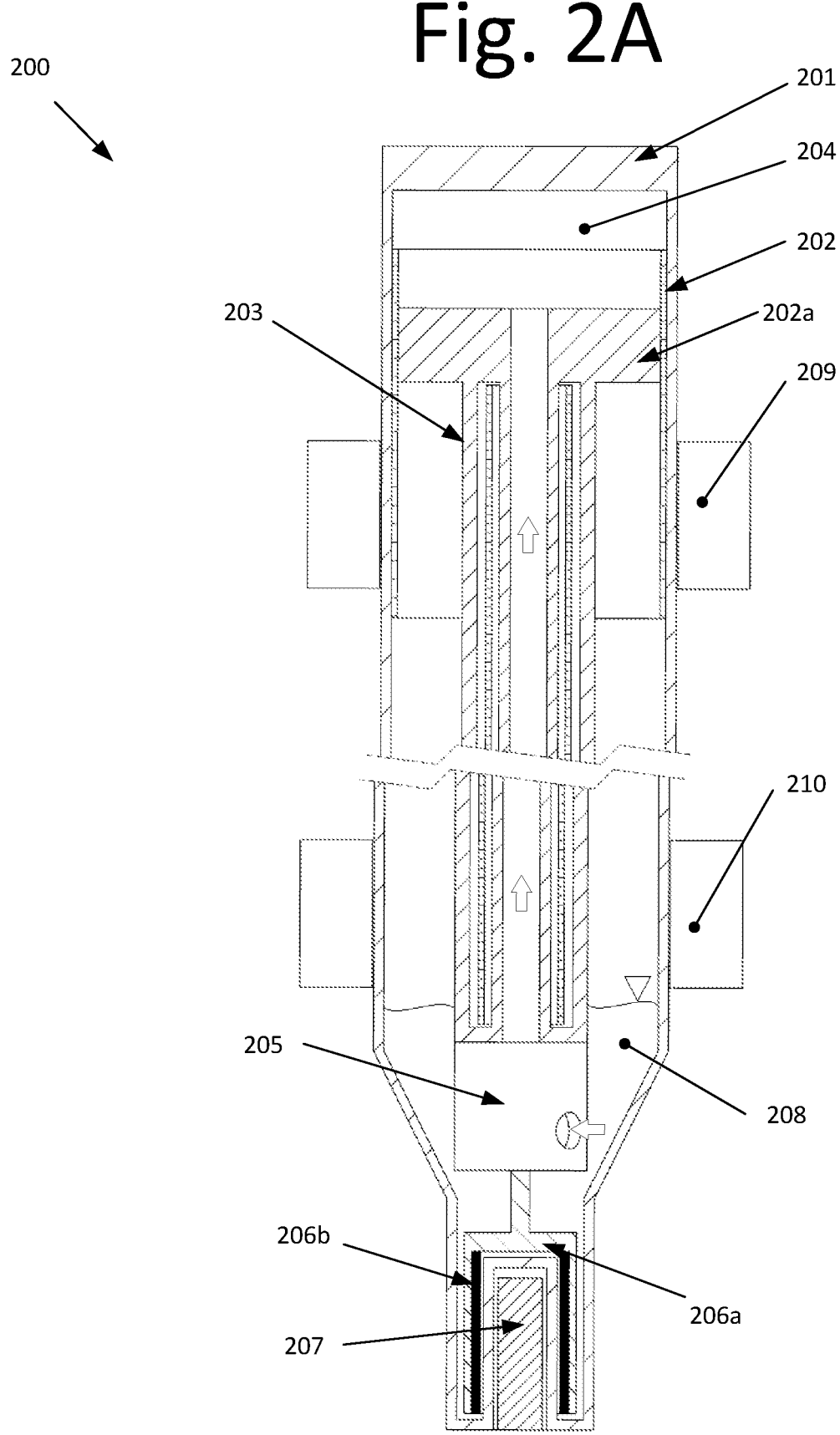
FIG. 2A illustrates a cross-sectional view of a pumped two-phase heat pipe with an internal pump and an internal artery, according to an embodiment of the present invention.

FIG. 2A illustrates a cross-sectional view of a pumped two-phase heat pipe (or "heat pipe") 200 with an internal pump 205 and an internal artery 203, according to an embodiment of the present invention. In this embodiment, pump 205 is internal to heat pipe loop 200, and artery 203 is also internal to heat pipe loop 200. See, for example, FIG. 2B. In some embodiment, pump 205 may be external or internal gear pumps depending on the configuration and design of heat pipe 200.

A container 201 may hermetically enclose a two-phase heat transfer system. The liquid working fluid may flow through wick 202 situated on the periphery of plug 202a from a high pressure liquid zone 204 to an evaporation zone 209. As noted above, in certain embodiments, evaporation zone 209 may also be known as hot zone 209.

Heat may then be added at or near evaporation zone 209 to vaporize the liquid working fluid. In this embodiment, the liquid working fluid, including the vapor, moves axially down the length of the tube to cold zone 210, where the working fluid condenses. In other embodiments, the working fluid may move in the opposite direction depending on the configuration of pumped two-phase heat pipe loop 200.

The condensed working fluid may pool at or near 208 and may be drawn into pump 205. In certain embodiments, pump 205 is moved by an out runner magnet rotor ("rotor") 206 and a series of field windings 207. As discussed above, rotor 206 is internal to the hermetic enclosure, and field windings 207 are external to the hermetic enclosure. Collectively, rotor 206 and field windings 207 may form a brushless direct current or an electric motor with a similar function. Pump 205 may move the working fluid up an insulated internal artery 203 to maintain pressure at liquid zone 204. A radiation shield embedded within artery 203 prevents the vaporization of sub-cooled liquid at or near liquid pool 208. The pressure may be sufficient to move the working fluid axially through wick 202 by Darcy flow or another mechanism with a similar flow.

Figure 2B:
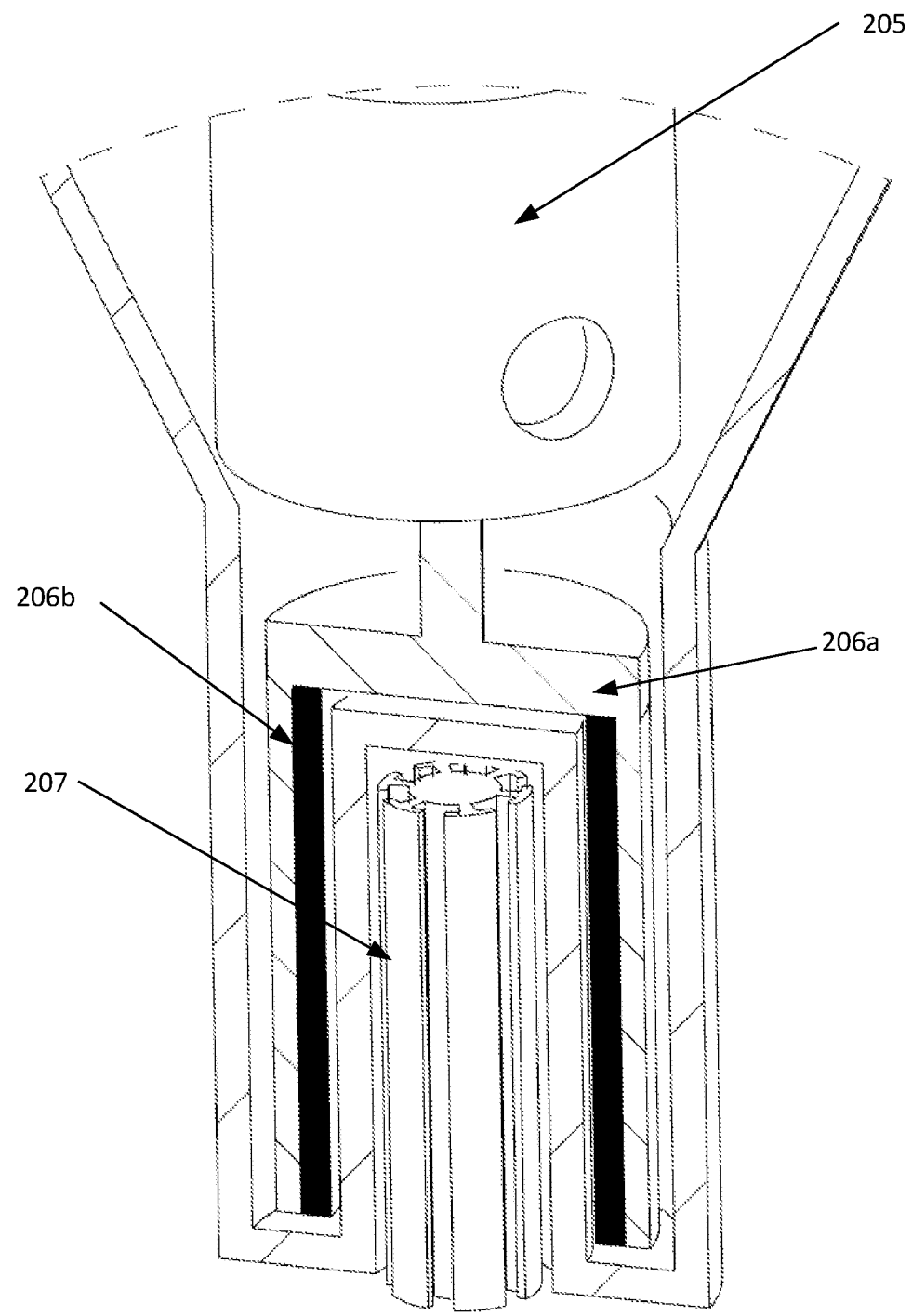
FIG. 2B illustrates a perspective view of the motor and the pump of the pumped two-phase heat pipe of FIG. 2A, according to an embodiment of the present invention.

FIG. 2B illustrates a perspective view of the motor assembly and pump 205 of heat pipe 200 of FIG. 2A, according to an embodiment of the present invention. In this embodiment, the working fluid is drawn into pump 205. Pump 205 is moved by a rotor 206 (which may be within the hermetic enclosure) and a series of field windings 207 (which may be external to the hermetic enclosure). Rotor 206 and field windings 207 may form a brushless direct current or an electric motor with a similar functionality. Pump 205 may move the working fluid up the internal artery in some embodiments. A variable speed controller (not shown) may regulate movement of pump 205. This may apply to the embodiments related to FIGS. 1 and 3-5. Rotor 206 and pump 205 assemblies are suspended in place by plug 202a to maintain alignment of rotor 206 with field windings 207 in certain embodiments. It should be appreciated that so long as the working fluid is in a liquid phase, the working fluid may serve to lubricate the moving rotor.

Figure 3:
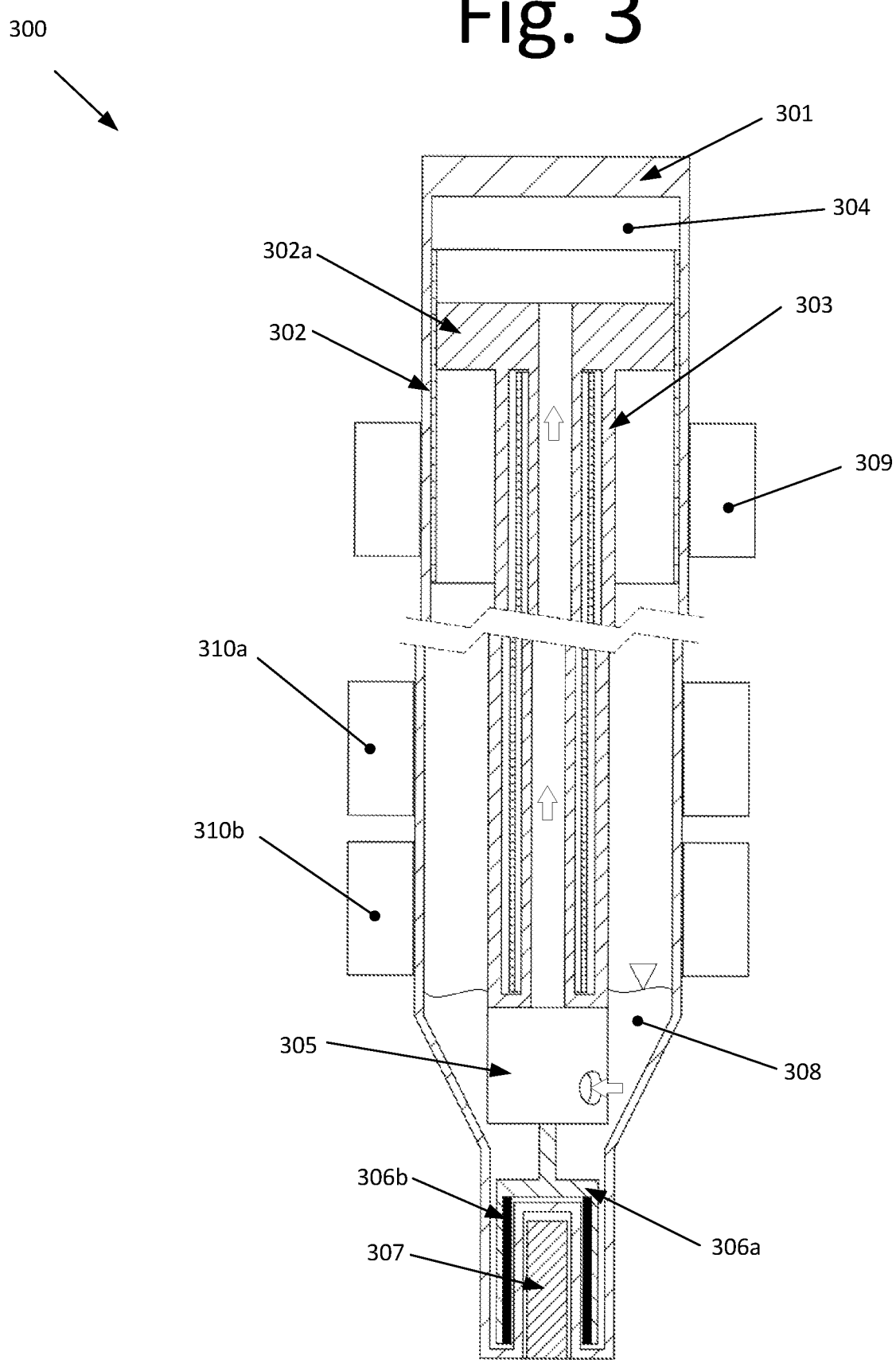
FIG. 3 illustrates a cross-sectional view of a pumped two-phase heat pipe with an internal pump and an internal artery for an energy application, according to an embodiment of the present invention.

FIG. 3 illustrates a cross-sectional view of a pumped two-phase heat pipe loop 300 with an internal pump 305 and an internal artery 303 and is used for an energy application, according to an embodiment of the present invention. For example, heat pipe loop 300 may be used for a solar energy application in some embodiments, e.g., a solar power tower. The solar power tower may be used for thermal energy transfer to a power block (or energy converter) 310a and a thermal energy storage system 310b. Container 301 may hermetically enclose the two-phase heat transfer system. The working fluid may flow through wick 302 situated on the periphery of plug 302a from a high pressure liquid zone 304 to evaporation zone 309. Heat is added at evaporation zone 309 vaporizing the working fluid. In this embodiment, the working fluid, including the vapor, moves axially down the length of the tube to power block 310a and thermal energy storage system 310b. For example, there is a film of falling liquid on the periphery of heat pipe 300, and vapor downward on the inside between artery 303 and liquid film on the periphery of heat pipe 300. This may also be where the vapor condenses at power block 310a and thermal energy storage system 310b.

During operation, cold zones may be formed by thermally linking to power block 310a and thermal energy storage system 310b. This may allow the working fluid to be maintained in a molten state in the region of pump 305 and out runner magnet rotor ("rotor") 306 both during operation and following shutdown.

During operation, the working fluid condensate may pool at or near 308 and may be drawn into pump 305. In this embodiment, pump 305 is moved by rotor 306 (internal to the hermetic enclosure) and a series of field windings 307 (external to the hermetic enclosure). In certain embodiments, rotor 306 and field windings 307 may form a brushless direct current or an electric motor with a similar functionality. Pump 305 may move the working fluid up internal artery 303 to maintain pressure sufficient to move working fluid 308 axially through wick 302 by Darcy flow or similar flow mechanisms.

Figure 4:
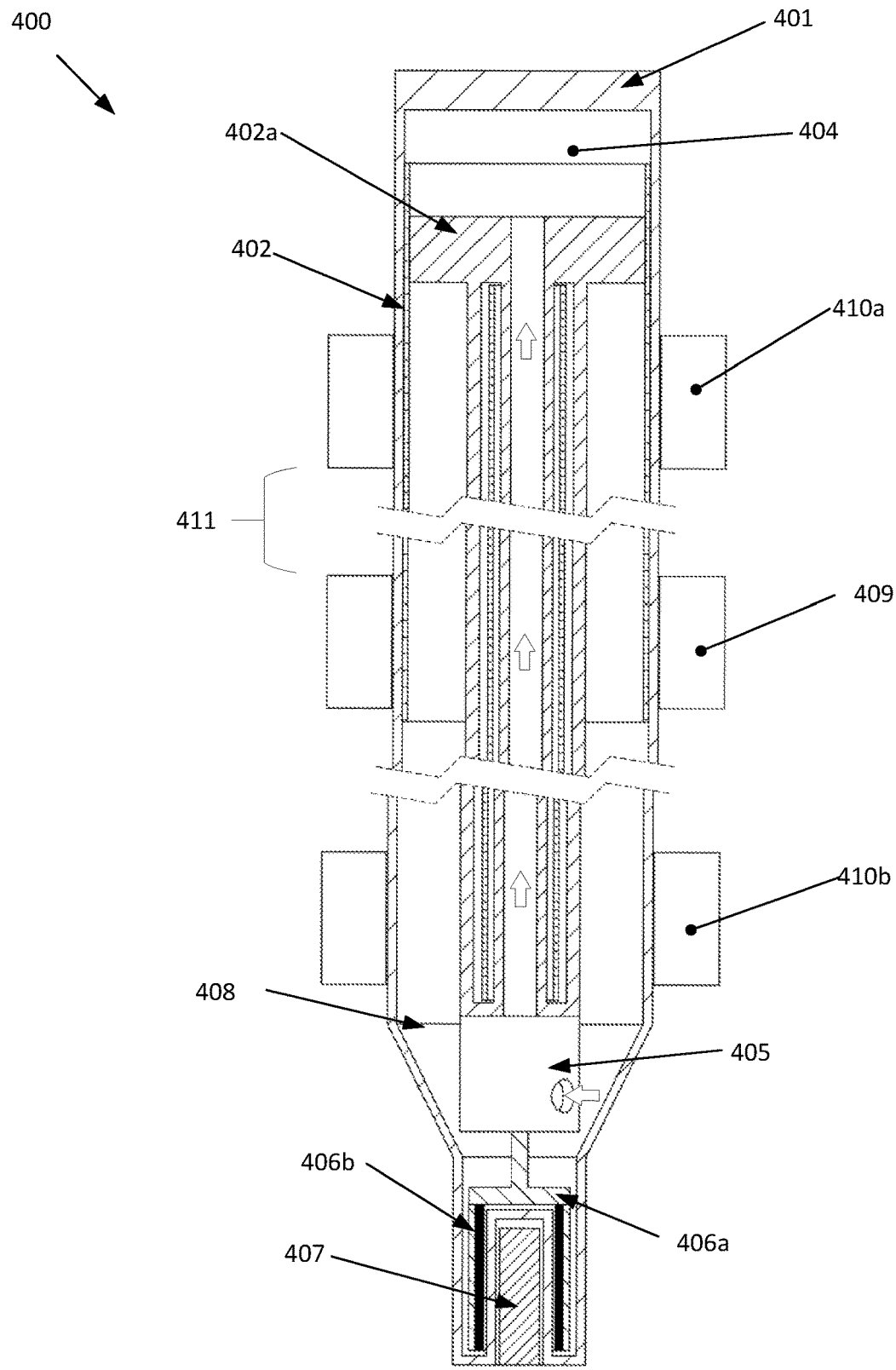
FIG. 4 illustrates a cross-sectional view of a pumped two-phase heat pipe with an internal pump and an internal artery for an energy application, according to an embodiment of the present invention.

FIG. 4 illustrates a cross-sectional view of a pumped two-phase heat pipe (or "heat pipe") 400 with an internal pump 405 and an internal artery 403 for an energy application, according an embodiment of the present invention. It should be appreciated that this embodiment may apply to a vertical double ended heat pipe. For example, heat pipe 400 may be used for a nuclear application in some embodiments. As shown in FIG. 4, heat pipe 400 may be used with a horizontal or vertical nuclear reactor. In these embodiments, heat may be applied or removed at arbitrary locations along the length of heat pipe 400. In such embodiments, wick 402 may extend to end of evaporation zone 409. Container 401 may hermetically enclose a two-phase heat transfer system in certain embodiments. The working fluid may flow through wick 402, which is situated on the periphery of plug 402a, from a high pressure liquid zone 404 to an evaporation zone 409. Heat is added at evaporation zone 409 to vaporize the working fluid. The working fluid may move axially up and down the length of the tube to cold zones 410a, 410b where it condenses.

During operation, cold zones 410a, 410b may be thermally linked to a power block heat exchanger or to a thermal energy storage system, or in some embodiments, use trace heat to keep working fluid at 408 in the molten state in the region of pump 405 and out runner magnet rotor ("rotor") 406, both during operation and following shutdown. Also, during operation, the condensed working fluid may pool at or near 408 and may be drawn into pump 405. In certain embodiments, pump 405 is moved by rotor 406 (internal to the hermetic enclosure) and a series of field windings 407 (external to the hermetic enclosure). Rotor 406 and field windings 407 may form a brushless direct current or an electric motor with a similar functionality. Pump 405 may move the condensed working fluid up internal artery 403 to maintain high pressure at liquid zone 404. This pressure may be sufficient to move the working fluid axially through wick 402 across the periphery of plug 402a by Darcy flow or a mechanism with a similar flow.

Once the fluid (e.g., liquid) transits through plug 402a, the flow may move axially along the interior of the pipe by capillary or gravity forces. This may hold true for some or all of the embodiments described herein. In some embodiments, the liquid may flow in either or both directions. For instance, if heat pipe 400 is vertical, part of the upward flowing fluid or vapor condenses at cold zone 410a above reactor core 409 and may return to reactor core 409 by gravity or capillary forces. The other part of the fluid or vapor may condense at cold zone 410b below reactor core 409 and return to reactor core 409 through pump 405 and artery 403.

In certain embodiments, capillary (or shielding) structure 411, which is between reactor core 409 and cold zone 410a, may shield counter flowing liquid returning to reactor core 409 from entraining into the vapor.

Figure 5:
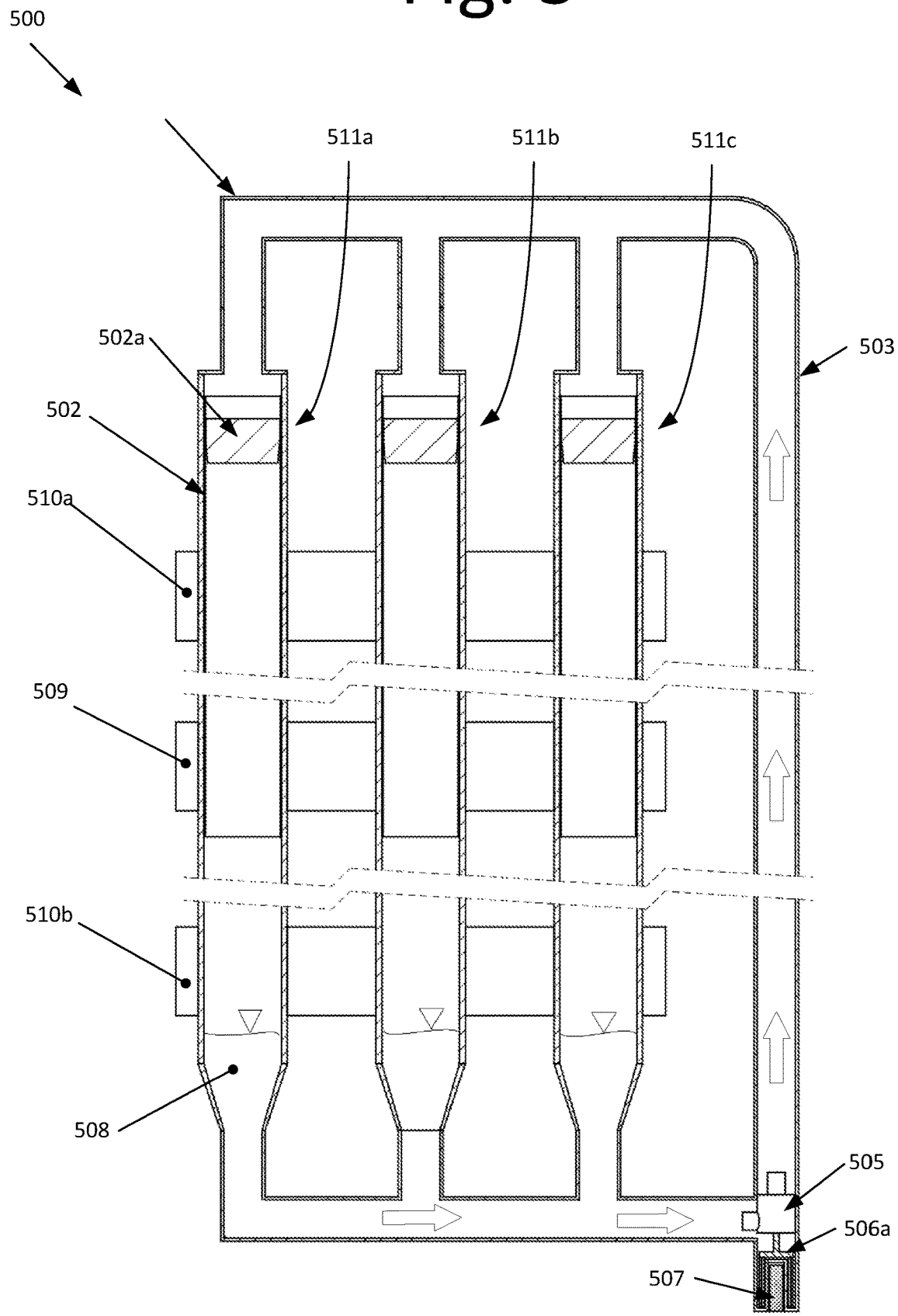
FIG. 5 illustrates a cross-sectional view of a pumped two-phase heat pipe loop with a plurality of branches, according to an embodiment of the present invention.

FIG. 5 is a diagram illustrating a pumped two-phased heat pipe loop (or "heat pipe loop") 500 with multiple channels 511a, 511b, 511c to transfer heat from an evaporation zone 509 to cold zones 510a, 510b, according to an embodiment of the present invention. Heat pipe loop 500 may be used with a horizontal or vertical nuclear reactor with heat applied at arbitrary locations along the length of heat pipe loop 500 in certain embodiments.

As shown in FIG. 5, container 501 and artery 503 hermetically encloses a two-phase heat transfer system. The working fluid may flow through wick 502 near the periphery of plug 502a. The working fluid may flow from a high pressure liquid zone 504 to an evaporation zone 509. Heat may then be added at or near evaporation zone 509 to vaporize the working fluid. The vaporized working fluid may move axially up and down the length of the tube to cold zones 510a, 510b, where the working fluid condenses, in certain embodiments.

During operation, cold zones 510a, 510b may be thermally linked to a power block heat exchanger or to a thermal energy storage system, or in some embodiments use trace heat to keep the working fluid in the molten state near pump 505 and out runner magnet rotor ("rotor") 506, both during operation and following shutdown. During operation, the condensed working fluid may pool at 508, and may be drawn into pump 505. Pump 505 may be moved by rotor 506 (internal to the hermetic enclosure) and field windings 507 (external to the hermetic enclosure).

Collectively, rotor 506 and field windings 507 may form a brushless direct current or an electric motor with a similar functionality. Pump 505 may move the working fluid up an external artery manifold 503 to maintain manifold pressure. This pressure may be sufficient to move the working fluid axially through wick 502 by Darcy flow or a mechanism with a similar flow.

Once the working fluid transits through plug 502a, the fluid may move axially along the interior of the pipes by capillary or gravity forces. It should be appreciated that the flow may move in one or both directions in some embodiments. If the pipe is vertical, part of the upward flowing fluid or vapor may condense at cold zone 510a, which is above reactor core (or hot zone) 509 and may return to reactor core 509 by gravity or capillary forces. The other part of the fluid or vapor may condense at cold zone 510b, which is below reactor core 509 and may return to reactor core 509 through pump 505 and external artery 503.

It should be appreciated that one or more embodiments described herein may employ active pressure gas control through PID or similar control schemes to inject gas into one or both condenser regions of the heat pipe. Inert gas may be introduced into the heat pipe by injection through a reentrant tube into the hermetic enclosure and can control the internal saturation pressure of the vapor. Also, in certain embodiments, the internal saturation temperature of the vapor and the active length of the heat pipe can control coupling of the heat pipe to surrounding heat exchangers.

Enhanced Counter Gravity Heat Pipe

Figure 6:
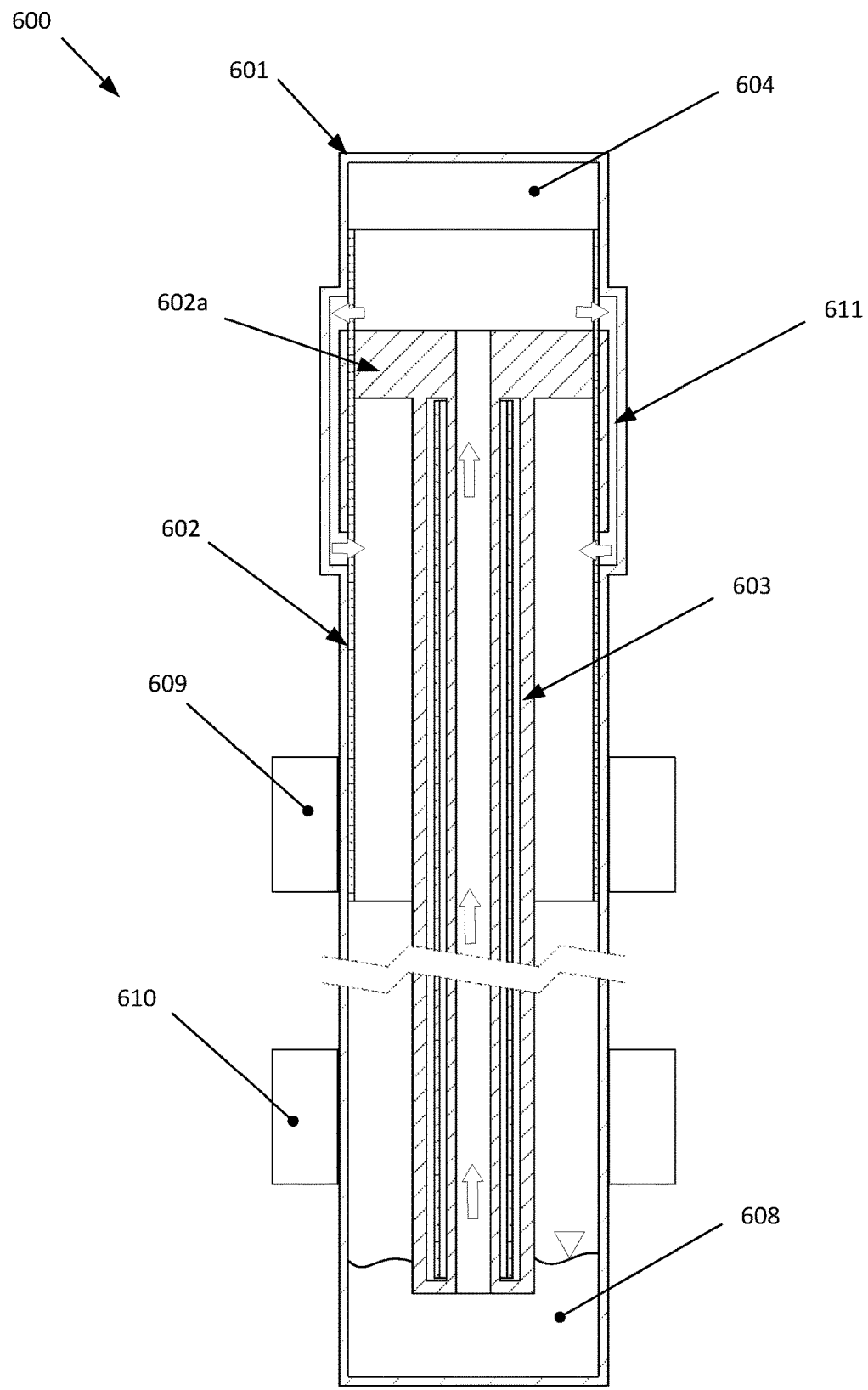
FIG. 6 is a cross-sectional diagram illustrating an enhanced counter gravity heat pipe that is functionally analogous to the pumped two-phase heat pipe of FIG. 2A, according to an embodiment of the present invention.

FIG. 6 is a cross-sectional diagram illustrating an enhanced counter gravity heat pipe 600 that is functionally analogous to the pumped two-phase heat pipe of FIG. 2A, according to an embodiment of the present invention. Depending on the embodiment, enhanced counter gravity heat pipe 600 may be used for energy applications such as solar and nuclear energy applications. In this embodiment, as heat is applied to hot zone (or evaporator region) 609 or cold zone (or condenser region) 610, vapor pressure may push against pool 608 and move liquid up artery 603 and into upper chamber 604. In some embodiments, artery 603 may be an insulated artery with an opening at or near the bottom, preventing vaporization as liquid move from condenser pool 608 to upper chamber 604. Upper chamber 604 may be sub-cooled in certain embodiments. In some embodiments, upper chamber 604 is temperature controlled by external sources, such as a cold body or convection, to create suction to syphon the liquid from condenser pool 608 to upper chamber 604 during startup. Liquid in upper chamber 604 passes across through annular channels on the periphery of plug 602a flowing into wick 602. In some embodiments, wick 602 spans upper chamber 604 across plug 602a and into hot zone 609. Liquid flows downward to hot zone 609 by gravity or capillary forces, where the liquid may evaporate. Vapor moves from hot zone 609 to cold zone 610, where it condenses. Liquid may fall from a region near cold zone 610 to a region near the free surface of condenser (or liquid) pool 608.

Enhanced counter gravity heat pipe 600 of FIG. 6 may include improvements over the art, such as lack of a plug above condenser pool 608, inclusion of insulated artery 603 to prevent vapor formation as liquid flows from condenser pool 608 to chamber 604, and the annular bypass feature around plug 602a, as depicted by the arrows beneath chamber 604. For example, the insulation in artery 603 prevents the liquid in artery 603 from being vaporized by vapor on the outside of artery 603. The vapor may be in the region defined by the bottom of plug 602a to the top of pool 608.

Liquid may flow up artery 603 and into chamber 604. Liquid may then flow into annulus (a flow bypass) 611, and down towards hot zone 609 for evaporation. It should be appreciated that annulus 611 connect upper chamber 604 to a space above hot zone 609 to cause the liquid to move around plug 602a with a low pressure drop. In another embodiment, liquid may also flow in wick 602, across plug 602a, and axially down wick 602 towards hot zone 609 for evaporation. In further embodiments, grooves may be placed in wall 601, which is adjacent to plug 602a. This may allow liquid to flow from chamber 604, into the grooves and around plug 602a, and into wick 602 supplying liquid to hot zone 609.

Figure 7:
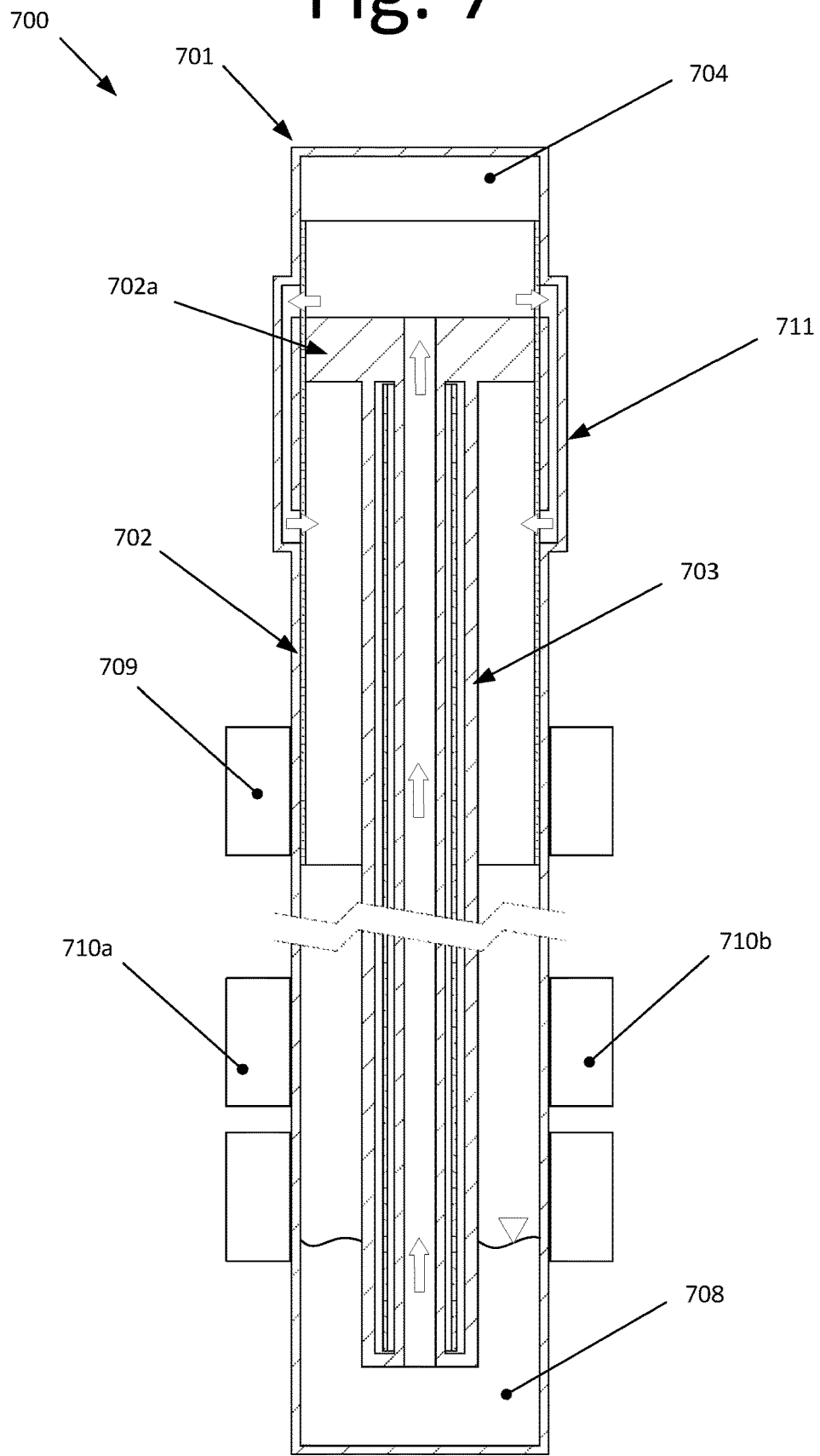
FIG. 7 is a cross-sectional diagram illustrating an enhanced counter gravity heat pipe that is functionality analogous to the pumped two-phase heat pipe of FIG. 3, according to an embodiment of the present invention.

FIG. 7 is a cross-sectional diagram illustrating an enhanced counter gravity heat pipe 700 that may be functionality analogous to the pumped two-phase heat pipe 300 of FIG. 3, according to an embodiment of the present invention. While enhanced counter gravity heat pipe 700 may be analogous to pumped two-phase heat pipe 300 of FIG. 3, enhanced counter gravity heat pipe 700 may push liquid up toward upper chamber 604 in a manner similar to that described in enhanced counter gravity heat pipe 600 of FIG. 6.

In this embodiment, as heat is applied to hot zone 709 or cold zones 710a and 710b, vapor pressure may push against pool 708 and move liquid up artery 703 and into chamber 704. Chamber 704 may be sub-cooled in certain embodiments. Liquid in chamber 704 passes across through annular channels on the periphery of plug 702a flowing into wick 702. Liquid flows downward to hot zone 709 by gravity or capillary forces, where the liquid may evaporate. Vapor moves from hot zone 709 to cold zones 710a and 710b, where it condenses. Cold zone 710a may be used for thermal energy storage and cold zone 710b may be used for a power block to be used for an energy application, or vice versa. Simply put, the functionality of cold zones 710a and 710b may be the same or different depending on the embodiment. Liquid may fall from a region near cold zones 710a and 710b to a region near the free surface of liquid pool 708.

Enhanced counter gravity heat pipe 700 of FIG. 7 may include improvements over the art, such as lack of a plug above condenser pool 708, inclusion of insulated artery 703 to prevent vapor formation as liquid flows from pool 708 to chamber 704, and the annular bypass feature around plug 702a, as depicted by the arrows beneath chamber 704. For example, the insulation in artery 703 prevents the liquid in artery 703 from being vaporized by vapor on the outside of artery 703. The vapor may be in the region defined by the bottom of plug 702a to the top of pool 708.

Liquid may flow up artery 703 and into chamber 704. Liquid may then flow into annulus 711, and down towards hot zone 709 for evaporation. In another embodiment, liquid may also flow in wick 702, across plug 702a, and axially down wick 702 towards hot zone 709 for evaporation.

Figure 8:
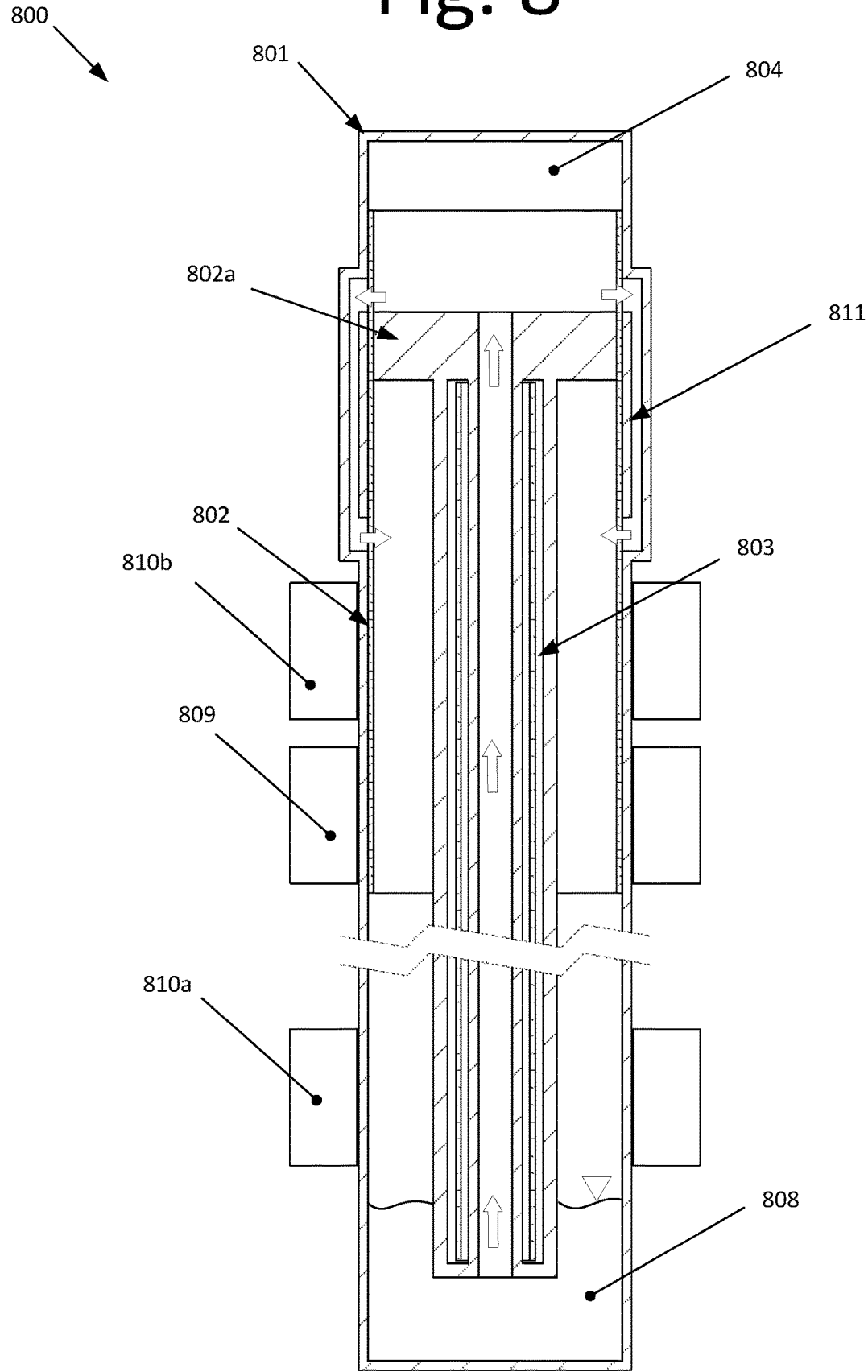
FIG. 8 is a cross-sectional diagram illustrating an enhanced counter gravity heat pipe that is functionally analogous to the pumped two-phase heat pipe of FIG. 4, according to an embodiment of the present invention.

FIG. 8 is a cross-sectional diagram illustrating an enhanced counter gravity heat pipe 800 that is functionally analogous to the pumped two-phase heat pipe 400 of FIG. 4, according to an embodiment of the present invention. While enhanced counter gravity heat pipe 800 may be analogous to pumped two-phase heat pipe 400 of FIG. 4, enhanced counter gravity heat pipe 800 may push liquid up toward upper chamber 804 in a manner similar to that described in enhanced counter gravity heat pipe 600 of FIG. 6.

Enhanced counter gravity heat pipes 700 and 800 of FIGS. 7 and 8 may also have the same benefits as those described above with respect to FIGS. 3, 4, and 6. For example, depending on the embodiment, enhanced counter gravity heat pipes 700 and 800 may be used for energy applications such as solar and nuclear energy applications In this embodiment, as heat is applied to hot zone 809 (or evaporator region) or cold zones (or condensers) 810*a* and 810*b*, vapor pressure may push against condenser pool 808 and move liquid up artery 803 and into upper chamber 804. Chamber 804 may be sub-cooled in certain embodiments. Liquid in chamber 804 passes across through annular channels on the periphery of plug 802*a* flowing into wick 802. Liquid flows downward to hot zone 809 by gravity or capillary forces, where the liquid may evaporate. Vapor moves from hot zone 809 to cold zone 810, where it condenses. Liquid may fall from a region near cold zones 810*a* and 810*b* to a region near the free surface of condenser pool 808. In some embodiments, for energy applications, a cold zone 810*b* is located above hot zone 809, and cold zone 810*a* is located below hot zone 809.

Enhanced counter gravity heat pipe 800 of FIG. 8 may include improvements over the art, such as lack of a plug above condenser pool 808, inclusion of insulated artery 803 to prevent vapor formation as liquid flows from condenser pool 808 to upper chamber 804, and the annular bypass feature around plug 802*a*, as depicted by the arrows beneath upper chamber 804. For example, the insulation in artery 803 prevents the liquid in artery 803 from being vaporized by vapor on the outside of artery 803. The vapor may be in the region defined by the bottom of plug 802*a* to the top of condenser pool 808.

Liquid may flow up artery 803 and into upper chamber 804. Liquid may then flow into annulus 811, and down towards hot zone 809 for evaporation. In another embodiment, liquid may also flow in wick 802, across plug 802*a*, and axially down wick 802 towards hot zone 809 for evaporation. In some embodiments, the vapor may flow in either or both directions. For instance, if heat pipe 800 is vertical, part of the upward flowing vapor condenses at cold zone 810*b* above hot zone 809 and may return to hot zone 809 by gravity or capillary forces. The other part of the vapor may condense at cold zone 810*a* below hot zone 809 and return to hot zone 809 through artery 803. In some embodiments, hot zone 709 moves the vapor below to cold zone 610*a*, and condenser pool 608 collects forming a free surface above an entrance of artery 803.

It will be understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions are possible, while remaining within the spirit and scope of the invention. In order to determine the metes and bounds of the invention, therefore, reference should be made to the appended claims.

The invention claimed is:

1. A counter-gravity two-phase heat pipe loop, comprising:
   a liquid pool comprising a free surface feeding a working fluid in a liquid state to a Mechanical pump, wherein
   the mechanical pump is configured to drive the working fluid in the liquid state up from the liquid pool, and across an external artery and down into a high pressure liquid zone,
   the mechanical pump is further configured to maintain pressure in the high pressure liquid zone to drive the working fluid in the liquid state across a periphery of a plug below the high pressure liquid zone, down into a hot zone that vaporizes the working fluid and into one or more cold zones for condensing the working fluid,
   the plug is placed below the high pressure liquid zone and above the hot zone, the hot zone being placed above the one or more cold zones and below the plug, the one or more cold zones being placed above the liquid pool and below the hot zone, all of which are connected without any intervening structures,
   a liquid transport structure is situated on the periphery of the plug, and
   the liquid transport structure hydraulically connects the high pressure liquid zone to the hot zone.

2. The counter-gravity two-phase heat pipe loop of claim 1, wherein heat is conducted through a wall at the hot zone to vaporize the working fluid.

3. The counter-gravity two-phase heat pipe loop of claim 2, wherein the vaporized working fluid travels to or near the one or more cold zones and condenses in a tube surrounded by the one or more cold zones.

4. The counter-gravity two-phase heat pipe loop of claim 2, wherein a portion of the working fluid that does not vaporize in the hot zone falls along an inside surface of the liquid transport structure and a tube wall past the one or more cold zones to a liquid pool, enabling the portion of the working fluid to be drawn in the pump.

5. The counter-gravity two-phase heat pipe loop of claim 1, wherein the pump is driven by a rotor, a magnet, and a series of field windings, the rotor and magnet are within a hermetically sealed enclosure and the field windings are external to the hermetically sealed enclosure, forming an electrical motor configured to operate while immersed in the working fluid.

6. The counter-gravity two-phase heat pipe loop of claim 1, wherein the hot zone is configured to receive the working fluid and wherein as the working fluid passes through the hot zone a first portion of the working fluid vaporizes and a second portion remains in a liquid state, after passing through a hot zone the first portion and the second portion of the working fluid flow into the one or more cold zones.

\* \* \* \* \*